United States Patent
McGrew et al.

(10) Patent No.: US 11,916,887 B2
(45) Date of Patent: *Feb. 27, 2024

(54) DETECTING DOMAIN FRONTING THROUGH CORRELATED CONNECTIONS

(71) Applicant: Cisco Technology, Inc., San Jose, CA (US)

(72) Inventors: David McGrew, Poolesville, MD (US); Blake Harrell Anderson, Chapel Hill, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,820

(22) Filed: Jan. 27, 2023

(65) Prior Publication Data

US 2023/0179581 A1    Jun. 8, 2023

Related U.S. Application Data

(63) Continuation of application No. 17/498,392, filed on Oct. 11, 2021, now Pat. No. 11,582,208.

(51) Int. Cl.
*H04L 9/40* (2022.01)

(52) U.S. Cl.
CPC ........ *H04L 63/0428* (2013.01); *H04L 63/166* (2013.01)

(58) Field of Classification Search
CPC ............................ H04L 63/0428; H04L 63/166
USPC .......................................................... 713/151
See application file for complete search history.

(56) References Cited

U.S. PATENT DOCUMENTS

| | | | |
|---|---|---|---|
| 6,449,651 B1 | 9/2002 | Dorfman et al. | |
| 9,092,635 B2 | 7/2015 | Asad et al. | |
| 9,294,446 B2 | 3/2016 | Hill-Jowett | |
| 9,438,494 B2 * | 9/2016 | Samuell | H04L 47/193 |
| 10,862,782 B2 * | 12/2020 | Perkins | H04L 43/0876 |
| 11,627,050 B2 * | 4/2023 | Marozas | H04L 67/535 |
| | | | 726/3 |
| 2002/0057800 A1 | 5/2002 | Gordon et al. | |
| 2005/0044366 A1 | 2/2005 | Pucheral et al. | |

(Continued)

OTHER PUBLICATIONS

Mitre, ATT&CK, Proxy: Domain Fronting, Contributors: Matt Kelly, @breakersall, Version: 1.1, Created: Mar. 14, 2020, Last Modified: Sep. 16, 2020, https://attack.mitre.org/techniques/T1090/004/.

(Continued)

*Primary Examiner* — Amare F Tabor
(74) *Attorney, Agent, or Firm* — Baker Botts L.L.P.

(57) ABSTRACT

According to an embodiment, a method receives one or more messages associated with connecting a client and a first host. At least one of the messages comprises an encrypted portion indicating the first host and at least one of the messages comprises a cleartext portion indicating a second host. The method determines first and second sets of links associated with the first and second host, respectively. The first set is determined based on monitoring a result of connecting the client and the first host. The second set is determined based on observing behavior associated with connecting to the second host. The method detects domain fronting in response to determining, based on comparing the first set of links and the second set of links, that the first host differs from the second host.

20 Claims, 3 Drawing Sheets

(56) References Cited

U.S. PATENT DOCUMENTS

| | | | |
|---|---|---|---|
| 2007/0124602 | A1 | 5/2007 | Wald et al. |
| 2010/0049655 | A1 | 2/2010 | Nilsson et al. |
| 2012/0254618 | A1 | 10/2012 | Moore |
| 2014/0223179 | A1 | 8/2014 | Wang |
| 2017/0302703 | A1 | 10/2017 | Buruganahalli et al. |
| 2019/0266200 | A1* | 8/2019 | Francolla ............ H04L 61/4511 |
| 2020/0092258 | A1 | 3/2020 | Stokes |
| 2020/0213335 | A1 | 7/2020 | Marzorati et al. |
| 2020/0244672 | A1 | 7/2020 | Grill et al. |
| 2020/0358792 | A1 | 11/2020 | Bazalgette et al. |
| 2021/0303164 | A1* | 9/2021 | Grunwald ............. G06F 3/0629 |
| 2021/0303527 | A1* | 9/2021 | Grunwald ........... G06F 16/1824 |

OTHER PUBLICATIONS

Ntop, How to Detect Domain Hiding (a.k.a. as Domain Fronting), Posted Aug. 19, 2020, https://www.ntop.org/ndpi/how-to-detect-domain-hiding-a-k-a-as-domain-fronting/.

DigiNinja Something about Security, Domain fronting through Cloudflare, https://digi.ninja/blog/cloudflare_example.php.

Cisco/mercury, mercury/src/tls_scanner.cc, https://github.com/cisco/mercury/blob/main/src/tls_scanner.cc.

* cited by examiner

DETECTING DOMAIN FRONTING THROUGH CORRELATED CONNECTIONS

PRIORITY

This nonprovisional application is a continuation under 35 U.S.C. § 120 of U.S. patent application Ser. No. 17/498,392 filed on Oct. 11, 2021, and entitled "DETECTING DOMAIN FRONTING THROUGH CORRELATED CONNECTIONS," all of which is hereby incorporated by reference in its entirety.

TECHNICAL FIELD

In general, certain embodiments relate to detecting domain fronting through correlated connections.

BACKGROUND

Network security monitoring may use domain fronting detection to detect domain fronting. Domain fronting refers to an evasive technique that may be used by malware and "censorship circumvention" software, like Tor, to hide the true destination of a Transport Layer Security (TLS) connection. An unauthorized party may use domain fronting to facilitate unauthorized actions, such as exfiltrating sensitive or proprietary data from a computer system. In order to prevent such unauthorized actions, it is desirable for network security monitoring to detect domain fronting. However, existing methods of detecting domain fronting may be inefficient or may fail to adequately detect domain fronting. Certain embodiments of the present disclosure may provide solutions to this problem.

DESCRIPTION OF EXAMPLE EMBODIMENTS

Overview

Figure 1:
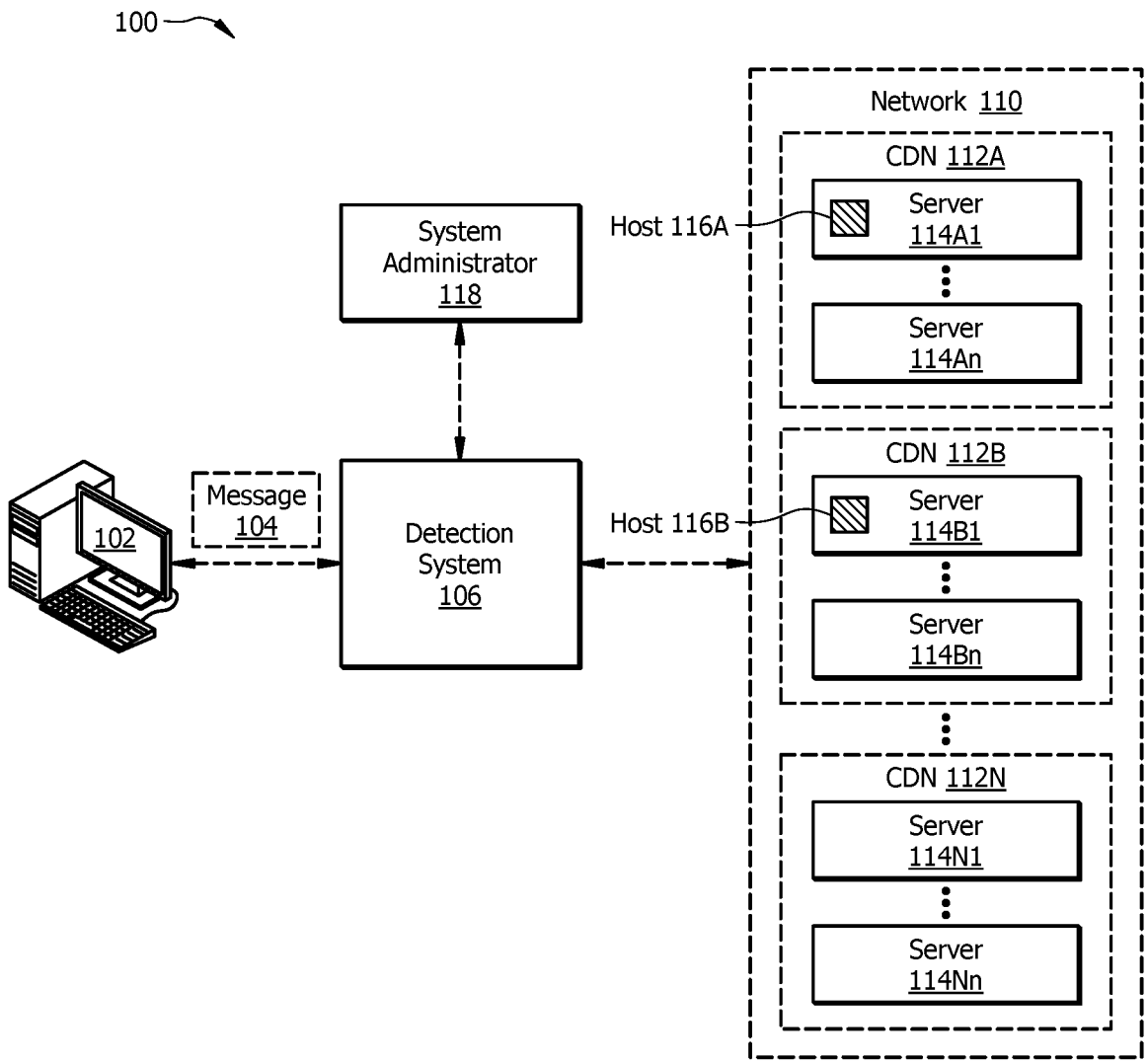
FIG. 1 illustrates an example of a network, in accordance with certain embodiments.

According to certain embodiments, a system comprises one or more processors and one or more computer-readable non-transitory storage media comprising instructions that, when executed by the one or more processors, cause one or more components of the system to perform operations. The operations comprise receiving, from a client, one or more messages associated with connecting the client and a first host. At least one of the messages comprises an encrypted portion indicating the first host and at least one of the messages comprises a cleartext portion indicating a second host. The operations further comprise determining a first set of links and a second set of links. The first set of links is associated with the first host and is determined based on monitoring a result of connecting the client and the first host. The second set of links is associated with the second host and is determined based on observing behavior associated with connecting to the second host. The operations further comprise determining, based on comparing the first set of links and the second set of links, whether the first host differs from the second host and detecting domain fronting in response to determining that the first host differs from the second host.

According to another embodiment, a method comprises receiving, from a client, one or more messages associated with connecting the client and a first host. At least one of the messages comprises an encrypted portion indicating the first host and at least one of the messages comprises a cleartext portion indicating a second host. The method comprises determining a first set of links and a second set of links. The first set is associated with the first host and is determined based on monitoring a result of connecting the client and the first host. The second set is associated with the second host and is determined based on observing behavior associated with connecting to the second host. The method comprises determining, based on comparing the first set of links and the second set of links, whether the first host differs from the second host and detecting domain fronting in response to determining that the first host differs from the second host.

According to yet another embodiment, one or more computer-readable non-transitory storage media may embody instructions that, when executed by a processor, cause the performance of operations. The operations comprise receiving, from a client, one or more messages associated with connecting the client and a first host. At least one of the messages comprises an encrypted portion indicating the first host and at least one of the messages comprises a cleartext portion indicating a second host. The operations further comprise determining a first set of links and a second set of links. The first set of links is associated with the first host and is determined based on monitoring a result of connecting the client and the first host. The second set of links is associated with the second host and is determined based on observing behavior associated with connecting to the second host. The operations further comprise determining, based on comparing the first set of links and the second set of links, whether the first host differs from the second host and detecting domain fronting in response to determining that the first host differs from the second host.

Technical advantages of certain embodiments of this disclosure may include one or more of the following. As an example, certain embodiments provide an efficient way of detecting domain fronting. For example, when a website is visited by a normal web browser, this will typically create some number of subsequent TLS connections to load additional data that is needed to render the website. When a website is used as a domain front, the expected subsequent TLS connections will be absent because the client is not actually visiting the advertised site. Certain embodiments use these facts and curated data to identify the absence of expected TLS connections, which provides evidence of the client using domain fronting. Certain embodiments detect domain fronting without requiring Man-in-the-Middle (MITM) decryption of a TLS connection. Certain embodiments perform more intensive domain fronting analysis on sessions at higher risk of domain fronting and less intensive domain fronting analysis on sessions at lower risk of domain fronting, which may allow for efficient use of memory, processing, or other resource of the domain fronting detection system.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Network security monitoring needs to be able to detect applications using domain fronting, to detect malware communication and unsanctioned/evasive applications that insiders could use to exfiltrate sensitive or proprietary data, and to correctly apply a security policy based on Domain Name System (DNS) names. It is also useful to detect TLS servers that provide domain fronting to their clients.

Domain fronting is supported by several cloud providers as follows. A TLS handshake may be used to establish a TLS connection. The TLS handshake may comprise a "client_hello" (an unencrypted message that contains the server_name extension) and other handshake messages, which may be encrypted or unencrypted. After the handshake, the client sends an encrypted application_data record containing an HTTP request, which contains the Host field. In a valid TLS client_hello record, the server_name extension contains the cleartext domain name of the server the client is attempting to contact. The server_name extension is used by the load balancer in a virtual hosting environments (such as Content Delivery Networks (CDNs)) to properly route traffic without needing to decrypt the session and extract the Hypertext Transfer Protocol (HTTP) Host field (e.g., the Host field that is included in an encrypted application_data record that the client sends after the handshake). In a standard TLS connection, the server_name value will match the decrypted HTTP Host value. In a connection using domain fronting, the client will advertise some benign domain in the server_name extension, and then after the TLS handshake completes, the client will send an encrypted HTTP request where the HTTP Host header contains the intended target domain name, which is different than the server_name value. This technique allows a client to communicate with blocked domains on their network.

Certain existing solutions detect domain fronting using Man-in-the-Middle (MITM) decryption of the TLS connection. Once the session is decrypted, one can easily identify if the outer TLS server_name does not match the inner HTTP Host field. These methods, however, fail to detect domain fronting in the common case in which MITM decryption is not possible and the (not yet standardized) encrypted server_name extension is not used by the client. Certain embodiments of the present disclosure may provide a solution to this or other problems associated with detecting domain fronting.

Certain embodiments of the present disclosure are based on the observation that, after a browser loads a web page from a server, it then loads additional pages from other servers, to retrieve the data for HyperText Markup Language (HTML) "src=" links and to follow HTTP redirects, as needed. The "src=" links are an intrinsic part of a web site, and are used for loading javascript, loading images and other data, connecting with third party services, and other purposes. A constellation of expected resources (such as pages loaded, sites visited, servers accessed, TLS connections requested, and/or use of or interaction with other resources) and the server name values used by their TLS connections, can be observed by a network monitoring system such as a firewall or intrusion detection system. A TLS connection that uses domain fronting, and pretends to visit a particular web site, will not perform the subsequent loads that a browser would perform on visiting that site.

In certain embodiments, a domain fronting detection system tracks all of the server_names associated with a particular source address (that is, a particular host on the internet), and for each TLS server visited, checks to see if the other servers in the constellation of associated servers are visited within a short time period, for example, one to five seconds. The constellation of servers associated with a site can be learned by observing network traffic, or by sending an HTTPS request to the site and recursively following all "src=" links and redirects. It should be noted that while browser caching might reduce some of the subsequent loads, experiments have shown that there is still enough dynamic, non-cacheable content in practice for this technique to be effective.

The technique above can be improved by maintaining a list of TLS servers or CDNs that support domain fronting and performing a more intensive analysis of TLS server_names to the sessions that connect with those servers. Another improvement is to use TLS fingerprinting to identify the client process (e.g., Chrome, Firefox, wget, cURL, python, etc.) as non-browser applications are less likely to visit web sites designed to serve browsers.

FIG. 1 illustrates an example of a system 100, in accordance with certain embodiments. The example illustrated in FIG. 1 includes one or more clients 102, a detection system 106, a network 110, and a system administrator 118. In certain embodiments, network 110 may comprise a plurality of content delivery networks (CDNs) 112A-112N. Each CDN may comprise one or more servers 114. For example, CDN 112A may comprise servers 114A1-114An, CDN 112B may comprise servers 114B1-114Bn, and CDN 112N may comprise servers 114N1-114Nn. A server 114 may provide one or more hosts. For example, server 114A1 may provide host 116A, and server 114B1 may provide host 116B.

In general, detection system 106 receives one or more messages 104 associated with connecting the client 102 and the first host 116A. A message 104 may be in the form of a packet, a signal, a request, a response, or other suitable message. At least one of the messages comprises an encrypted portion indicating the first host 116A and at least one of the messages comprises a cleartext portion indicating a second host 116. The second host 116 may be the same as the first host 116A (in the case where domain fronting is not used), or the second host 116 may be different than the first host 116A (in the case where domain fronting is used, the second host 116 may correspond to host 116B, for example). Detection system 106 may perform a domain fronting analysis without decrypting the encrypted portion of the one or more messages 104. For example, detection system 106 determines first and second sets of links associated with the first host 116A and the second host 116, respectively. The first set is determined based on monitoring a result of connecting the client 102 and the first host 116A. The second set is determined based on observing behavior associated with connecting to the second host 116. Detection system 106 detects domain fronting in response to determining, based on comparing the first set of links and the second set of links, that the first host 116A differs from the second host 116 (e.g., host 116B). In certain embodiments, detection system 106 performs a security response based on detecting domain fronting, such as blocking the connection between the client 102 and the first host 116A and/or notifying system administrator 118 that the domain fronting has been detected. Further details of steps that may be performed by detection system 106 are discussed below with respect to FIG. 2.

Client 102 may refer to any suitable device operable to communicate messages 104 with network 110. In certain embodiments, client 102 may be associated with a local area network (LAN) or a private network, and network 110 may comprise an external network (e.g., the Internet). Examples of a client 102 may include a desktop computer, a laptop or notebook computer, a mobile telephone, a personal digital assistant (PDA), a tablet computer system, etc. In certain embodiments, one or more of the messages 104 may be associated with a TLS connection. For example, at least some of the messages 104 may correspond to a TLS handshake. A TLS handshake may refer to a process that kicks off a communication session that uses TLS encryption. During the TLS handshake, client 102 and first host 116A may exchange messages to acknowledge each other, verify each other, establish the encryption algorithms they will use, and/or agree on session keys. After completing the TLS handshake, client 102 and first host 116A may exchange application data via an encrypted session. As an example, client 102 may be configured to run a browser application. The browser application may request certain content from first host 116A, and first host 116A may provide application data comprising the requested content.

Detection system 106 may refer to any suitable system for monitoring the behavior of any of the other components of system 100 (e.g., any system capable of monitoring traffic between client 102 and host 116). Detection system 106 may be configured to run on an endpoint (such as client 102) or another node (such as a gateway, switch, router, etc.). In certain embodiments, detection system 106 may be implemented as an intrusion detection system, network monitoring system, or firewall (e.g., an on-premises firewall or a cloud-delivered firewall).

CDN 112 may comprise a plurality of geographically distributed servers 114 that facilitate delivery of web content to a user of client 102. CDN 112 may store content like web pages, images, and video in servers 114, and a user may interact with client 102 to access the content in order to do things like watch a movie, download software, check a bank balance, post on social media, make purchases, and so on. Host 116 may run on server 114 and may provide particular content (e.g., a host may be associated with a particular site, which may be identified by a domain name, a uniform resource locator (URL), a link, an IP address, or other suitable identifier).

In certain embodiments, detection system 106 may monitor the servers 114 or hosts 116 visited in response to a TLS record that contains a domain name in cleartext (e.g., a TLS record of a client_hello message) and a TLS record that contains a hostname in encrypted text (e.g., a TLS record of a subsequent message 104 that client 102 sends after the TLS handshake). The detection system 106 may compare the servers 114 or hosts 116 visited in response to the TLS record comprising the hostname in encrypted text to the servers 114 or hosts 116 expected to be visited (based on a learned constellation of servers 114 or host 116 associated with the domain name indicated in the TLS record comprising the domain name in cleartext). If the servers 114 or hosts 116 visited in response to the TLS record comprising the hostname in encrypted text are as expected, the detection system 106 may determine that the TLS record is not using domain fronting. Alternatively, if the servers 114 or hosts 116 visited in response to the TLS record comprising the hostname in encrypted text are not as expected, the detection system 106 may determine that the TLS record is using domain fronting (e.g., that the cleartext domain name in the client_hello message does not match the encrypted hostname in the subsequent TLS record).

Detection system 106 may obtain ground truth information associated with the expected constellation of servers 114 or hosts 116 in any suitable manner. In certain embodiments, the detection system 106 tracks each server_name associated with a particular source address (e.g., a particular host 116 on the Internet) in order to determine the expected constellation of servers 114 or hosts 116 typically visited within a short time period of contacting the particular source address. In certain embodiments, detection system 106 examines actual HTML webpages to get source links. For example, detection system 106 may comprise a browser that renders the webpage in order to obtain source links indicating where to go and/or what content to retrieve. This may be accomplished by sending an HTTPS request to the site and recursively following all "src=" links and redirects. Optionally, certain embodiments may determine the expected constellation of servers 114 or hosts 116 dynamically, in real-time based on receiving a record for which detection system 106 determines to perform domain fronting detection. In addition, or in the alternative, detection system 106 may learn the constellation of servers 114 or host 116 associated with a site by observing network traffic. For example, detection system 106 may passively observe a large number of connections to determine typical connections that go to a particular server 114 or host 116. In an embodiment, detection system 106 may mine stored data associated with a large number of connections to determine typical connections that go to a particular server 114 or host 116.

To apply the ground truth, certain embodiments of detection system 106 look for additional connections. In certain embodiments, detection system 106 may broaden the analysis from TLS to also consider any protocol that can have a domain name and to look for those domain names, for example, by going up the stack looking for IP addresses associated with the domain names. Examples of such protocols include QUIC, DTLS, and HTTP.

In certain embodiments, detection system 106 may have access to information about whether certain CDNs 112 and/or servers 114 (such as TLS servers) offer domain fronting. The information may indicate one or more CDNs 112 and/or one or more TLS servers with a relatively high likelihood of using domain fronting. For example, a TLS scanner may be used to determine whether a particular CDN 112 and/or TLS server on the Internet supports domain fronting. In one option, detection system 106 may maintain a list of CDNs 112 and/or TLS servers that support domain fronting, and detection system 106 may perform a more intensive analysis of TLS server_names to the sessions that connect with those CDNs 112 and/or TLS servers. In another option, detection system 106 may use TLS fingerprinting to identify a client process and to determine a likelihood that the client process is susceptible to domain fronting. For example, browser applications (e.g., Chrome, Firefox, etc.) may be more susceptible to domain fronting than non-browser applications because non-browser applications are less likely to visit web sites designed to serve browsers. Detection system 106 may perform a more intensive analysis of applications that are susceptible to domain fronting.

In certain embodiments, the detection system 106 uses TLS fingerprinting to facilitate detection of domain fronting. The TLS fingerprinting may track one or more factors such as an application used, a site visited, a process that created a connection, etc. The detection system 106 may determine a level of analysis to perform based on whether the factors associated with the TLS fingerprint indicate a risk of domain fronting, such as whether the application used, the site visited, and/or the process that created the connection are known to support domain fronting. The additional context from the TLS fingerprint may allow the detection system 106 to reduce false positives. As an example, applications like cURL can operate in a mode that does not recursively pull down source links. Such applications may do network connectivity checks that may look similar to domain fronting but are not domain fronting. The additional context from the TLS fingerprint may allow the detection system 106 to detect abnormal or suspicious behavior. As an example, if a particular application (such as a non-browser application) typically only goes to certain sites, the detection system 106 may detect suspicious behavior if the particular application goes to a different site.

In one example, the detection system 106 may see a message 104 that begins a TLS handshake. The message 104 may contain unencrypted information (e.g., the beginning of the TLS handshake, such as a client_hello message, may occur prior to exchange of encryption keys or negotiation of encryption parameters). The detection system 106 may observe the client_hello message to obtain information about the client 102, such as encryption supported by the client 102, TLS extensions used by the client 102, parameters specific to a process or TLS library, destination of the message 104 (e.g., domain name, destination IP address, or port), etc. The detection system 106 may provide input the information into a machine learning algorithm that learns TLS fingerprint information. In this manner, detection system 106 may learn further information to distinguish typical behavior from abnormal behavior.

In certain embodiments, the detection system 106 considers source ("src=") links inside of HTML protocol. For example, the detection system 106 checks the set of secondary links ("src=" links) that get pulled up when the client 102 visits a site in order to determine whether the secondary links are expected. Certain embodiments recursively look at each "src=" link when a client visits a src= site that links to another src= site. Certain embodiments also consider redirect links in HTTP protocol. As an example, suppose a client 102 tries to visit a particular site, such as example.com. Further suppose the HTTP server responds and redirects the client to www.example.com. For example, the HTTP server may respond with a status code 301 (Moved Permanently) to redirect the client 102 to a different site. The detection system 106 follows any redirects and checks whether the client 102 is redirected to an expected site. Thus, the constellation of expected sites may be identified via source links or other links on an HTML page (e.g., resources on the HTML page body) and via redirects to additional sites referred to in an HTTP response and next HTTP request. Certain embodiments consider both the body of the HTTP response and the headers within the response.

Figure 2:
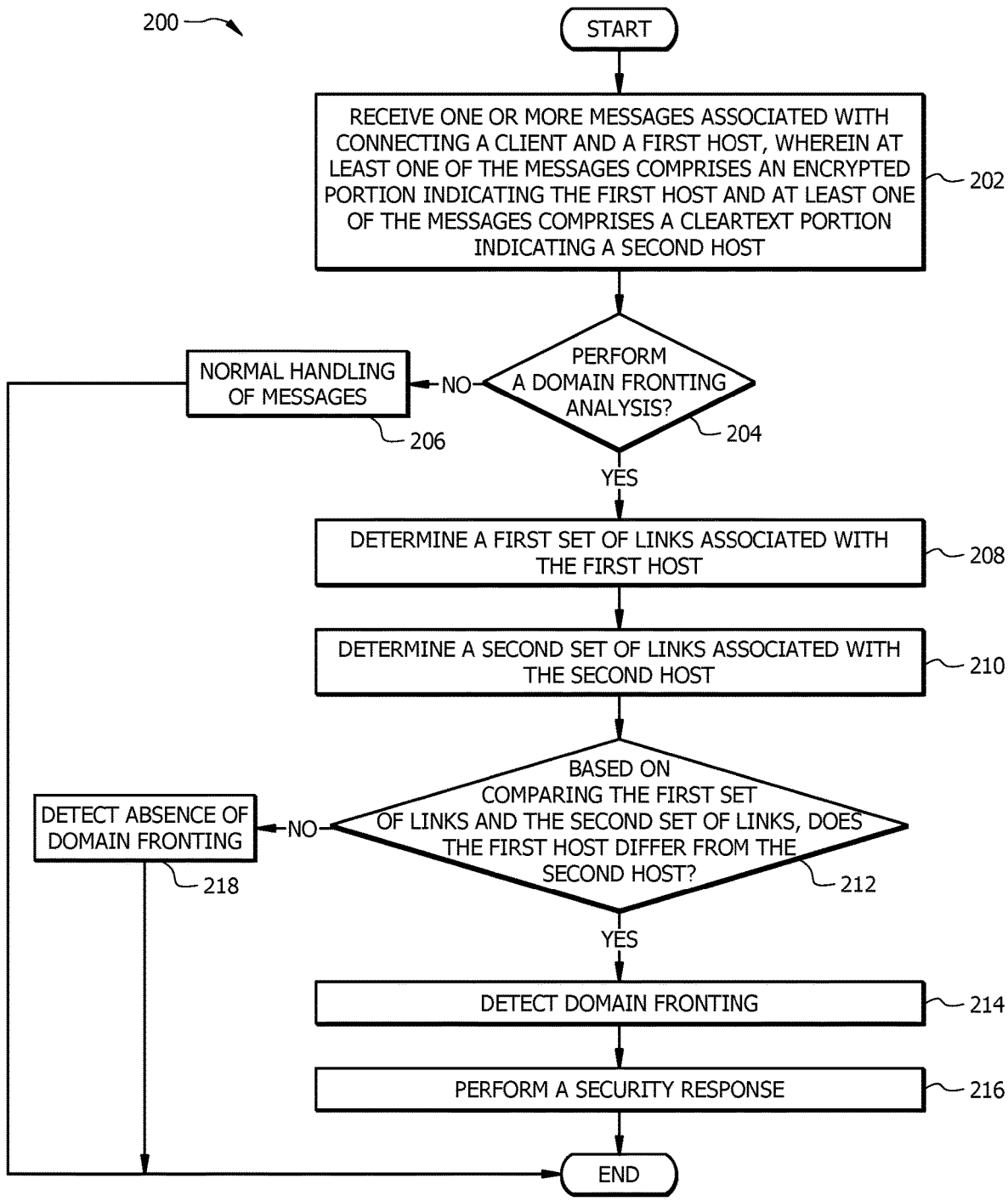
FIG. 2 illustrates an example of a method, in accordance with certain embodiments.

FIG. 2 illustrates an example of a method 200, in accordance with certain embodiments. The steps of method 200 may be performed by detection system 106 described with respect to FIG. 1 or other suitable system. In certain embodiments, method 200 begins at step 202 with receiving one or more messages 104 associated with connecting the client 102 and a first host 116A. In certain embodiments, the one or more messages 104 may be received by a detection system 104 configured as a passive network observer, such as a firewall positioned between a source and a destination of each message 104. As an example, the client 102 may be the source and a host 116 (e.g., first host 116A or second host 116B) may be the destination for a message 104, or vice versa.

In certain embodiments, at least one of the messages 104 received in step 202 comprises an encrypted portion indicating the first host 116A, and at least one of the messages 104 comprises a cleartext portion indicating a second host 116B. As an example, the one or more messages 104 may be associated with a first TLS connection. The at least one of the messages that comprises the cleartext portion may correspond to a client_hello message. The client_hello message comprises a server_name extension that indicates the second host 116B (the advertised hostname). The client_hello message may be received during a TLS handshake. The TLS handshake may include other handshake messages (unencrypted and/or encrypted messages). The at least one of the messages 104 that comprises the encrypted portion may include an HTTP Host field that indicates the first host 116A. For example, the encrypted portion may comprise an encrypted application_data record containing an HTTP request. The HTTP request may be received after the TLS handshake.

In certain embodiments, the method proceeds to step 204 with determining whether to perform a domain fronting analysis. The determination is based on a level of risk associated with a connection between a client 102 and a host 116. In certain embodiments, the level of risk may be determined based at least in part on information determined from at least one of the messages 104 received in step 202. Thus, certain embodiments may perform step 204 after receiving at least one of the messages 104 in step 202 (such as the client_hello message). Optionally, step 204 may be performed with or without waiting to receive certain of the other messages 104 received in step 202. Certain embodiments use fingerprinting (e.g., TLS fingerprinting) to determine whether to perform the domain fronting analysis (e.g., a fingerprint may indicate a level of risk).

In an embodiment, the level of risk may depend at least in part on a type of application that the client 102 uses for connecting with the host 116. Thus, if the client 102 uses a first type of application (such as a non-browser application) associated with a relatively lower level of risk, method 200 may determine not to perform the domain fronting analysis (proceed to step 206). If the client 102 uses a second type of application (such as a browser application) associated with a relatively higher level of risk, method 200 may determine to perform the domain fronting analysis (proceed to step 208). Or, certain embodiments may associate certain web browsers (such as Chrome or Firefox) with a lower level of risk than a Tor.

In another embodiment, the level of risk may depend at least in part on whether the destination of one or more messages sent by the client 102 (such as a CDN to which the client 102 sends messages) is known to support domain fronting or is known to not support domain fronting. If the destination is known to not support domain fronting, method 200 may determine not to perform the domain fronting analysis (proceed to step 206). If the destination is known to support domain fronting, method 200 may determine to perform the domain fronting analysis (proceed to step 208).

In certain embodiments, step 204 may be optional (e.g., method 200 may be configured to perform the domain fronting analysis in each case).

At step 206, based on determining a low risk level in step 204, method 200 performs normal handling of messages 104. For example, method 200 may communicate messages 104 between the client 102 and network 110 without performing domain fronting analysis. Alternatively, if domain fronting analysis is to be performed, method 200 may proceed to step 208.

At step 208, method 200 determines a first set of links. The first set of links is associated with the first host 116A. The first set of links is determined based on monitoring a result of connecting the client 102 and the first host 116A. For example, the first set of links comprises one or more source links and/or one or more redirect links that the client 102 receives as the result of connecting to the first host 116A.

Continuing with the TLS example, the one or more messages 104 received in step 202 may be associated with a first TLS connection (e.g., TLS handshake and subsequent messages). Suppose the first TLS connection connects to first-host.com. The first set of links detected in step 208 may be detected from one or more subsequent TLS connections initiated by the client 102 within a pre-determined time period of the first TLS connection. For example, the connection to first-host.com may result in the client 102 performing subsequent TLS connections to connect to first-host-1.com, first-host-2.com, first-host-3.com and/or other sites (such as content sites or advertisement sites associated with first-host.com). In certain embodiments, method 200 determines the first set of links from a cleartext portion of subsequent TLS connections. For example, method 200 may observe the server_name extension included in client_hello messages that follow the connection to first-host.com.

At step 210, method 200 determines a second set of links (e.g., one or more source links and/or one or more redirect links). Note that determining the second set of links in step 210 may be performed at any suitable time (e.g., prior to determining the first set of links in step 208, after determining the first set of links in step 208, or in parallel to performing the first set of links in step 208). The second set of links is associated with the second host 116B. The second set of links is determined based on observing behavior associated with connecting to the second host 116B.

As a first option, the second set of links may be determined dynamically based on real-time communication with the second host 116B. For example, detection system 106 may comprise a browser and/or other application that may initiate its own connection to second host 116B. Or, detection system 106 may instruct a security client (e.g., a client 102 configured for network security purposes) to initiate a connection to second host 116B and to communicate a result to detection system 106. Continuing with the TLS example, the one or more messages 104 received in step 202 may indicate that second host 116B is associated with second-host.com. Detection system 106 may perform a TLS handshake and connect with second-host.com. Detection system 106 may observe that second-host.com indicates links to second-host-1.com, second-host-2.com, second-host-3.com and/or other sites (such as content sites or advertisement sites associated with second-host.com). In certain embodiments, method 200 determines the second set of links from a cleartext portion of subsequent TLS connections. For example, method 200 may observe the server_name extension included in client_hello messages that follow the connection to second-host.com.

As a second option, the second set of links may be determined based on stored data indicating previous results of connecting to the second host 116B. For example, detection system 106 may have access to a data log, archive, database, or other stored data from which detection system 106 can determine typical behavior when clients 102 connect to second-host.com.

At step 212, method 200 determines, based on comparing the first set of links and the second set of links, whether the first host 116A differs from the second host 116B. Continuing with the TLS example, method may determine that if the client 102 had actually connected to the second host 116B, the client 102 would have been expected to request subsequent TLS connections with second-host-1.com, second-host-2.com, and second-host-3.com (i.e., the second set of links determined in step 210). However, because the client 102 instead requests TLS connections with first-host-1.com, first-host-2.com, and first-host-3.com (i.e., the first set of links determined in step 208), method 200 determines that the first host 116A differs from the second host 116B.

At step 214, method 200 detects domain fronting in response to determining that the first host 116A differs from the second host 116B. In this manner, method 200 detects the domain fronting without the detection system 106 decrypting the encrypted portion of the one or more messages 104 received in step 202 (e.g., without decrypting the portion of the one or more messages 104 indicating the first host 116A, such as the encrypted application_data record containing an HTTP request that contains the Host field indicating the first host 116A).

At step 216, method 200 performs a security response based on detecting domain fronting. As an example, method 200 may block the connection between the client 102 and the first host 116A. As another example, method 200 may create or update a fingerprint (e.g., TLS fingerprint) to indicate characteristics associated with domain fronting (such as a CDN 112, server 114, hos tname, etc. associated with the connection). As another example, method 200 may notify a system administrator 118 that the domain fronting has been detected. A security response may be provided in real-time (to provide a fast response if there is a problem), with delay (to allow for retrospective analysis), or both.

The preceding example describes a case in which method 200 detects domain fronting. In other cases, method 200 may detect an absence of domain fronting. As an example, at step 202, method 200 receives one or more messages 104 associated with connecting the client 102 and a first host 116A. At least one of the messages 104 comprises an encrypted portion indicating the first host 116A, and at least one of the messages comprises a cleartext portion indicating a second host 116A. That is, the first host 116A is the same as the second host 116A, however, method 200 may not know that the first host 116A is the same as the second host 116A because method 200 does not decrypt the encrypted portion. At step 208, method 200 determines a first set of links. The first set of links (such as first-host-1.com, first-host-2.com, first-host-3.com) is associated with the first host 116A. The first set of links is determined based on monitoring a result of connecting the client 102 and the first host 116A. At step 210, method 200 determines a second set of links. The second set of links (such as first-host-1.com, first-host-2.com, first-host-3.com) is associated with the second host 116A. The second set of links is determined based on observing behavior associated with connecting to the second host 116A. At step 212, method 200 determines, based on comparing the first set of links and the second set of links, whether the first host 116A differs from the second host 116A. In this example, the first set of links and the second set of links are the same (the first and second set of links each comprise first-host-1.com, first-host-2.com, first-host-3.com), so method 200 determines that the first host 116A does not differ from the second host 116A. In other words, method 200 determines that the first host 116A and the second host 116A are the same. At step 218, method 200 detects an absence of domain fronting in response to determining that the first host 116A and the second host 116A are the same. Method 200 may then proceed with normal processing of messages (without having to perform a security response). In certain embodiments, method 200 may create or update a fingerprint to indicate characteristics associated with the absence of domain fronting.

Thus, throughout this disclosure, "first host" and "second host" may refer to the same host or a different host, depending on whether the domain fronting is used. Similarly, the "first set of links" and the "second set of links" may comprise the same (or similar) set of links or a different set of links, depending on whether domain fronting is used.

Additionally, "first" and "second" do not require any particular order, unless expressly indicated otherwise or indicated otherwise by context. As an example, a message 104 indicating a second host may be received prior to receiving a message 104 indicating a first host. As another example, a second set of links may be determined prior to determining a first set of links.

Figure 3:
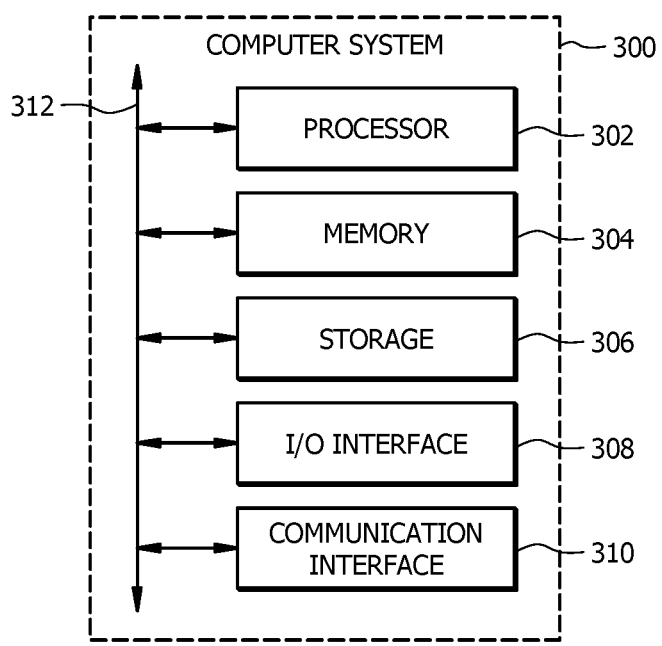
FIG. 3 illustrates an example of a computer system, in accordance with certain embodiments.

Reference is now made to FIG. 3, wherein is shown an example computer system 300 which may be used by the systems and methods described herein. As an example, a computer system 300 may be used to implement a client 102, a detection system 106, a server 114, or other component of system 100 shown in FIG. 1. In particular embodiments, one or more computer systems 300 perform one or more steps of one or more methods described or illustrated herein, such as method 200 of FIG. 2. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example, and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In summary, certain embodiments of the present disclosure may facilitate detection of domain fronting. In some cases, domain fronting begins with a DNS query from a client to a fronted domain. From the point of view of a passive network observer, the DNS query looks benign. For example, the DNS query may be directed to a site (such as example.com) that is not blocked or otherwise considered suspicious. In response to the DNS query, the client receives an IP address that appears to be legitimate. Then malware creates a TLS connection. For example, as part of a TLS connection, the malware may provide a TLS record that includes the benign site (example.com) as the server name in a cleartext portion of a TLS record and includes a malicious site (malware.com) as the host name in an encrypted portion of another TLS record. This domain fronting may be possible, for example, if malware.com is hosted on the same CDN as example.com. A passive network observer would be able to observe the benign site in cleartext, but would not be able to observe the malicious site in the encrypted text. Because the cleartext looks legitimate, and because the passive network observer cannot decrypt the encrypted portion to verify its contents, it may be difficult for the passive network observer to detect the malware.

To address this problem, certain embodiments of the present disclosure provide solutions based on the observation that requests that actually access the benign site (example.com), as opposed to a malicious site (malware.com), are expected to behave in a manner that is typical for that site. For example, accessing example.com may be expected to prompt subsequent requests for links that example.com points to (such as links to content sites or advertisement sites associated with the example.com page). Subsequent TLS connections would be expected to go to those links. If domain fronting occurs, the site actually accessed would be malware.com, rather than example.com. Accessing malware.com may result in behavior that is not typical for example.com. For example, subsequent requests for resources would not match the expected resources associated with example.com (e.g., subsequent TLS connections would go to different pages than those associated with example.com).

Certain embodiments of the present disclosure come up with an inventory of CDN networks or cloud providers that support domain fronting. When communicating with those networks, certain embodiments monitor whether a TLS connection prompts an expected set of additional TLS connections within a time period typical for the site that the TLS connection purports to connect to. For example, suppose a TLS connection that legitimately connects to example.com is typically followed within 5 seconds by TLS connections to example-1.com, example-2.com, and example-3.com. If the detection system receives a TLS connection that purports to connect to example.com, the detection system may perform domain fronting detection by analyzing whether the TLS connection is followed within a similar timeframe (e.g., 5 seconds or 5 seconds plus some margin to account for network delays) by TLS connections to example-1.com, example-2.com, and example-3.com. If yes, the detection system may determine that domain fronting has not been detected. If no, the detection system may determine that domain fronting has been detected. Thus, domain fronting may be detected by looking for the absence of expected TLS connections. Certain embodiments reduce false positives by curating lists of CDNs that support domain fronting, curating lists of websites that are typically used for domain fronting by evasive applications, and/or leveraging TLS fingerprints in order to determine when to apply more intensive analysis.

Certain embodiments may provide technical advantages compared to existing solutions. As an example, certain existing solutions may check for specific hash values associated with a domain and may alert upon detecting an unusual hash. Such existing solutions tend not to work well (they may fail to detect instances of domain fronting and/or they may detect false positives). By contrast, certain embodiments of the present disclosure monitor the set of connections that follow an initial connection, which may allow for more accurate detection of domain fronting.

For purposes of example and explanation, certain embodiments have been described with respect to certain protocols, such as TLS, HTTP, HTML, etc. Other embodiments may use other protocols. Certain examples have been described with reference to a constellation of associated servers or a constellation of expected sites. Other embodiments may apply more generally to a constellation of expected resources (such as pages loaded, sites visited, servers accessed, TLS connections requested, and/or use of or interaction with other resources).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components (such as a manager, controller, services engine, access point, wireless device, etc.) described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A detection system, the detection system comprising:
    one or more processors; and
    one or more computer-readable non-transitory storage media comprising instructions that, when executed by the one or more processors, cause one or more components of the detection system to perform operations comprising:
        receiving, from a client, a first message and a second message associated with connecting the client and a first host, wherein:
            the first message comprises an encrypted portion indicating the first host; and
            the second message comprises a server name extension indicating a second host;
        determining a first set of links, wherein the first set of links are associated with the first host and are determined based on monitoring a result of connecting the client and the first host;
        determining a second set of links, wherein the second set of links associated with the second host;
        determining, based on comparing the first set of links and the second set of links, whether the first host differs from the second host; and
        detecting domain fronting in response to determining that the first host differs from the second host;
    wherein monitoring the result of connecting the client and the first host comprises detecting zero or more subsequent connections initiated by the client within a predetermined time period of connecting the client and the first host.

2. The detection system of claim 1, wherein the first message and the second message are associated with a first Transport Layer Security (TLS) connection.

3. The detection system of claim 1, wherein:
    the first message comprises a Hypertext Transfer Protocol (HTTP) Host field that indicates the first host; and
    the second message corresponds to a client_hello message.

4. The detection system of claim 1, wherein the first set of links comprises a source link or a redirect link that the client receives in response to connecting to the first host.

5. The detection system of claim 1, wherein the second set of links is determined dynamically based on real-time communication with the second host.

6. The detection system of claim 1, wherein the second set of links is determined based on stored data indicating previous results of connecting to the second host.

7. The detection system of claim 1, the operations further comprising performing a security response based on detecting domain fronting.

8. A method, the method comprising:
    receiving, from a client, a first message and a second message associated with connecting the client and a first host, wherein:
        the first message comprises an encrypted portion indicating the first host; and
        the second message comprises a server name extension indicating a second host;
    determining a first set of links, wherein the first set of links are associated with the first host and are determined based on monitoring a result of connecting the client and the first host;
    determining a second set of links, wherein the second set of links associated with the second host;
    determining, based on comparing the first set of links and the second set of links, whether the first host differs from the second host; and
    detecting domain fronting in response to determining that the first host differs from the second host;
    wherein monitoring the result of connecting the client and the first host comprises detecting zero or more subsequent connections initiated by the client within a predetermined time period of connecting the client and the first host.

9. The method of claim 8, wherein the first message and the second message are associated with a first Transport Layer Security (TLS) connection.

10. The method of claim 8, wherein:
    the first message comprises a Hypertext Transfer Protocol (HTTP) Host field that indicates the first host; and
    the second message corresponds to a client_hello message.

11. The method of claim 8, wherein the first set of links comprises a source link or a redirect link that the client receives in response to connecting to the first host.

12. The method of claim 8, wherein the second set of links is determined dynamically based on real-time communication with the second host.

13. The method of claim 8, wherein the second set of links is determined based on stored data indicating previous results of connecting to the second host.

14. The method of claim 8, further comprising performing a security response based on detecting domain fronting.

15. One or more computer-readable non-transitory storage media embodying instructions that, when executed by a processor, cause performance of operations comprising:
    receiving, from a client, a first message and a second message associated with connecting the client and a first host, wherein:
        the first message comprises an encrypted portion indicating the first host; and
        the second message comprises a server name extension indicating a second host;
    determining a first set of links, wherein the first set of links are associated with the first host and are determined based on monitoring a result of connecting the client and the first host;
    determining a second set of links, wherein the second set of links associated with the second host;
    determining, based on comparing the first set of links and the second set of links, whether the first host differs from the second host; and
    detecting domain fronting in response to determining that the first host differs from the second host;

wherein monitoring the result of connecting the client and the first host comprises detecting zero or more subsequent connections initiated by the client within a predetermined time period of connecting the client and the first host.

16. The one or more computer-readable non-transitory storage media of claim 15, wherein the first message and the second message are associated with a first Transport Layer Security (TLS) connection.

17. The one or more computer-readable non-transitory storage media of claim 15, wherein:
the first message comprises a Hypertext Transfer Protocol (HTTP) Host field that indicates the first host; and
the second message corresponds to a client_hello message.

18. The one or more computer-readable non-transitory storage media of claim 15, wherein the first set of links comprises a source link or a redirect link that the client receives in response to connecting to the first host.

19. The one or more computer-readable non-transitory storage media of claim 15, wherein the second set of links is determined dynamically based on real-time communication with the second host.

20. The one or more computer-readable non-transitory storage media of claim 15, wherein the second set of links is determined based on stored data indicating previous results of connecting to the second host.

* * * * *